United States Patent

[11] 3,599,044

[72] Inventors Takeshi Takemura;
 Kikuo Kawasaki, both of Kawasaki, Japan
[21] Appl. No. 33,200
[22] Filed Apr. 30, 1970
[45] Patented Aug. 10, 1971
[73] Assignee Fuji Denki Seizo Kabushiki Kaisha
 Kawasaki-shi, Kanagawa-ken, Japan

[54] SUPERHIGH-SPEED RELAYING SYSTEM AND APPARATUS FOR PROTECTION OF POWER SYSTEMS
4 Claims, 28 Drawing Figs.

[52] U.S. Cl. ................................................. 317/36 D, 317/27 R
[51] Int. Cl. ................................................. H02h 3/00, H02h 5/00
[50] Field of Search ..................................... 317/36, 36 D, 27

[56] References Cited
UNITED STATES PATENTS

| | | | |
|---|---|---|---|
| 3,099,775 | 7/1963 | Mortlock et al. | 317/36 D |
| 3,163,802 | 12/1964 | Seguin et al. | 317/36 D |
| 3,369,156 | 2/1968 | Souillard | 317/27 X |
| 3,474,333 | 10/1969 | Hoel | 317/36 D |
| 3,475,655 | 10/1969 | Suzuki | 317/36 D |
| 3,543,092 | 11/1970 | Hoel | 317/36 D |

Primary Examiner—William M. Shoop, Jr.
Attorney—Holman & Stern

ABSTRACT: A superhigh-speed relaying system and apparatus for the protection of power systems featuring a directional distance relaying scheme, based essentially upon the simple equation representing the relationship among the voltage, current, resistance and inductance of a given power system:

$$L\frac{dI}{dt} + RI = E$$

where $E$ designates the voltage, $I$ the current, $R$ the resistance and $L$ the inductance. This expression holds true when, in the event of the occurrence of a fault, the DC component is superposed upon the fault current. And, given the phase relationship between the voltage $E$ and the current $I$, and the values for the inductance $L$ and the resistance $R$, the direction of and the distance to the location of the fault are obtainable. Moreover, by the same expression, the inductance $L$ is obtainable as a result of comparison made between the polarities and between the magnitudes of $E$ and $dI/dt$ when $I=O$, whereas the resistance $R$ is obtainable from comparison made between the polarities and between the magnitudes of $E$ and $I$ when $dI/dt=O$.

3,599,044

SUPERHIGH-SPEED RELAYING SYSTEM AND APPARATUS FOR PROTECTION OF POWER SYSTEMS

BACKGROUND OF THE INVENTION

This invention relates generally to the protection of power systems and, particularly, to a superhigh-speed relay system and apparatus, based on a directional distance relaying scheme, for the protection of the transmission lines and other electrical equipment of the power system.

Conventional counterparts of the relaying system of the invention include the "quantity comparison" system, with the use of electromagnetic relays, and the "phase comparison" system, with the use of transistor relays. Yet, according to these prior systems, the direction of and/or distance to the location of a fault tends to be measured erroneously due to the presence of a DC component superposed temporarily upon the fault current flowing in the faulty transmission line, so that such errors in measurement have to be prevented by making judgement upon the nature of the fault (i.e., whether it is internal or external to the line section under protection) after the lapse of several cycles from its occurrence. Consequently, the prior relaying systems have required the lapse of two or three cycles from the occurrence of a fault to the sending of a break order based on the judgement that the fault is internal, and that of another two or three cycles from the reception of the order by the breaker to the actual breaking of the faulty line section. The fault has thus been allowed to affect the power system for four cycles at the shortest.

The recent demands for quicker acting breakers, in tune with the advent of large-capacity power systems, have led to the development of the so-called "synchronous one-cycle breaker" capable of breaking action within one cycle from the reception of a break order. Theoretically, no further quicker acting breakers can exist, so that now there is no alternative left other than to quicken the operation time of the existing directional distance relays, if the period of time over which faults are allowed to affect the system is to be further curtailed.

SUMMARY OF THE INVENTION

It is accordingly a primary object of the present invention to provide a superhigh-speed directional distance relaying system capable of discriminating whether a fault caused in a section of a powder system is external or internal to the section within one cycle of the occurrence of the fault.

Another object of the invention is to provide a superhigh-speed directional distance relaying system capable of making correct discrimination of the direction of the location of a fault even when the DC component is superposed upon the fault current.

Still another object of the invention is to provide a superhigh-speed directional distance relaying apparatus such that it indicates an ideally quadrilateral performance impedance characteristic on an impedance plane.

Yet a further object of the invention is to provide a superhigh-speed directional distance relaying apparatus which functions correctly irrespective of the harmonics surge voltages that may be caused in power systems.

Yet a further object of the invention is to provide a superhigh-speed directional distance relaying apparatus altogether free from erroneous operation caused by the saturation of a current transformer adapted to detect fault current.

The novel features that are considered characteristic of the invention are set forth with some particularity in the appended claims.

The invention itself, however, with its additional objects and advantages, will best be understood from the detailed description below when read in connection with the accompanying drawings showing certain specific embodiments of the invention.

DETAILED DESCRIPTION OF THE INVENTION

Figure 1:
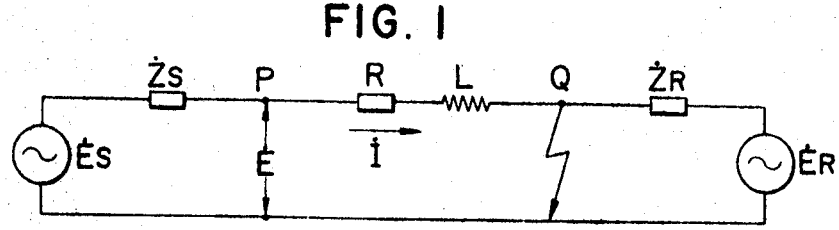
FIG. 1 diagrammatically shows an example of transmission system in general.

Referring now to the drawings, and specifically to FIG. 1 diagrammatically showing a general transmission system, the character $\dot{E}_s$ designates a voltage at the sending end, $\dot{Z}_s$ a power source impedance, $\dot{E}_R$ a voltage at the receiving end, $\dot{Z}_R$ a power source impedance, R a line resistance and L a line inductance. Let it be assumed that a relay is installed at a point P, and that the circuit was shorted at a point Q. The following relation exists between the time function $E(t)$ of the voltage $\dot{E}$ at the point P, the time function $I(t)$ of the current $\dot{I}$, the resistance R and the inductance L between the points P and Q:

$$R \cdot I(t) + L \frac{dI(t)}{dt} = E(t) \tag{1}$$

This equation holds true whether $F(t)$ and $I(t)$ are sine waves or not and irrespective of the superposition of any DC component. From the expression (1), therefore, first supposing an instant when the current becomes zero, $$L \left\{ \frac{dI}{dt} \right\}_{I=0} = \{E\}_{I=0}$$

$$L \left\{ E \Big/ \frac{dI}{dt} \right\}_{I=0} \tag{2}$$

where $I$ represents $I(t)$ and $E$ represents $E(t)$, and at an instant when the differential value $dI/dt$ of the current $I$ becomes zero, $$R \cdot I \big|_{\frac{dI}{dt}=0} = \{E\}_{\frac{dI}{dt}=0}$$

$$R = \{E/I\}_{\frac{dI}{dt}=0} \quad (3)$$

Hence the value for the inductance $L$ is obtainable from comparison between the differential value of the current and the instantaneous value of the voltage at the moment when the instantaneous value of the current becomes zero, and the value for the resistance $R$ from comparison between the instantaneous value of the current and that of the voltage when the differential value of the current becomes zero.

Suppose certain values $L$ and $R$. The impedance to the location of a fault is measurable if the relay is made to operate on conditions $$L_8 > \left\{ E \bigg/ \frac{dI}{dt} \right\}_{I=0} \quad (4)$$

$$R_8 > \{E/I\}_{\frac{dI}{dt}=0} \quad (5)$$

Figure 2A:
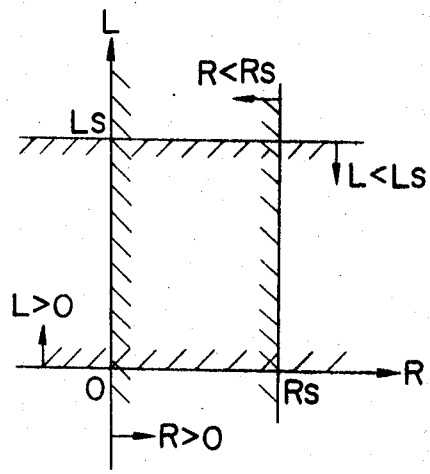
FIGS. 2a and 2b diagrammatically show the impedance characteristics as indicated according to the superhigh-speed relaying system of the invention.

These, on an impedance plane, correspond to the regions $L \leqq L_S$ and $R \leqq R_S$ in FIG. 2a.

Whether the impedance belongs to the zones $L>0$ and $R>0$ in FIG. 2a or not, on the other hand, can be known for conditions $$\left\{ E \bigg/ \frac{dI}{dt} \right\}_{I=0} > 0 \quad (6)$$

$$\{E/I\}_{\frac{dI}{dt}=0} > 0 \quad (7)$$

at the instants, respectively, when $I=0$ and when $dI/dt=0$. Accordingly, whether the impedance to the location of a fault is present in the quadrilateral shown in FIG. 2a or not can be determined from whether all the conditions (4), (5), (6) and (7) are satisfied. (It will be needless to say that the value $R_S$ is set inclusive of the arc resistance component that may be generated at the location of a fault.)

Figure 2B:
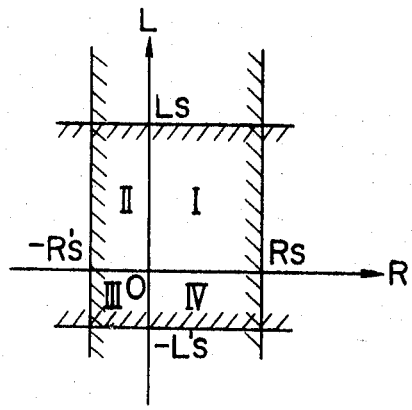

It will be obvious that a fault caused behind the location where a relay is installed can be detected, as shown in FIG. 2b, by comparing a ratio between the absolute values of $E$ and $dI/dt$, or $E$ and $I$, when these have different polarities at the instant when $I=0$ and $dI/dt=0$), with values $L'_S$ and $R'_S$ that are different from the above values $L_S$ and $R_S$. (The regions I, II, III, and IV in FIG. 2b will be described in detail later on.)

Figure 3:
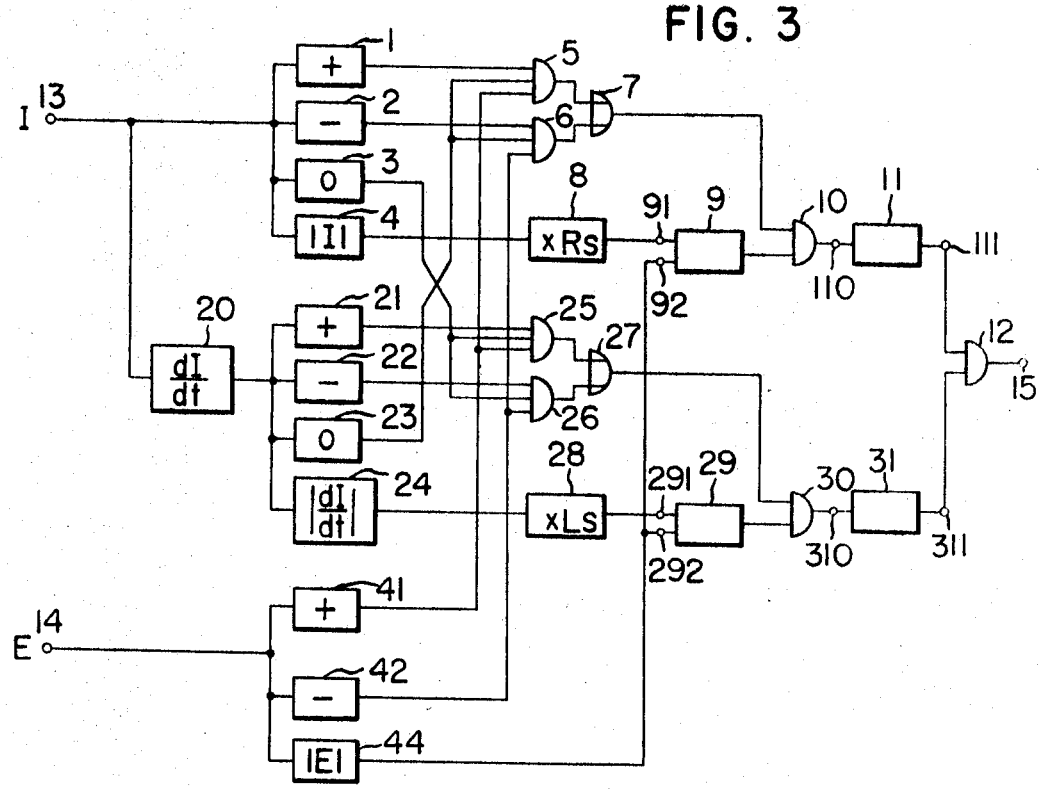
FIG. 3 is a block diagram showing an embodiment of the invention.

FIG. 3 shows a block diagram of an embodiment of the invention. In the drawing, the quantities in proportion to the instantaneous value of a current $I$ supplied at a terminal 13 are fed to a positive polarity discriminating circuit 1, a negative polarity discriminating circuit 2, a zero-point detecting circuit 3 and a full-wave rectifying circuit 4. A quantity proportionate to the instantaneous value of the current $I$ is also fed to a differentiating circuit 20, where it is differentiated, and thence to a positive polarity discriminating circuit 21, a negative polarity discriminating circuit 22, a zero-point detecting circuit 23 and a full-wave rectifying circuit 24. The quantities in proportion to the instantaneous value of a voltage $E$ supplied at a terminal 14, on the other hand, are fed to a positive polarity discriminating circuit 41, a negative polarity discriminating circuit 42 and a full-wave rectifying circuit 44.

The positive polarity discriminating circuits 1, 21 and 41 generate output signals when supplied with positive signals; the negative polarity discriminating circuits 2, 22 and 42 generate output signals when supplied with negative signals; and the zero-point detecting circuits 3 and 23 generate a short output pulse each time when their input signal passes its zero point. The full-wave rectifying circuits 4, 24 and 44 rectify the both half waves of their input signals and form their absolute values. The outputs of the circuits 1, 23 and 41 are led to an AND circuit 5, which, therefore, generate a short output pulse when $I>0$, $E>0$ and $dI/dt=0$. The outputs of the circuits 2, 23 and 42 are led to an AND circuit 6, which thus generates a short output pulse when $I<0$, $E<0$ and $dI/dt=0$. The outputs of the circuits 3, 21 and 41 are led to an AND circuit 25, which thus generates a short output pulse when $I=0$, $dI/dt>0$ and $E>0$. And the outputs of the circuits 3, 22 and 42 are led to an AND circuit 26, which thus generates a short output pulse when $I=0$, $dI/dt<0$ and $E<0$.

The outputs of the And circuits 5 and 6 are both led to an OR circuit 7, which thus generates a short output pulse if $I$ and $E$ are of the same polarity when $dI/dt=0$. The outputs of the AND circuits 25 and 26 are both led to an OR circuit 27, which thus generates a short output pulse if $E$ and $dI/dt$ are of the same polarity when $I=0$.

The output of the full-wave rectifying circuit 4 is led to an input terminal 91 of a comparator circuit 9 after having been amplified $R_S$ times by an amplifying circuit 8. To another input terminal 91′ of the comparator circuit 9 is led the output of the full-wave rectifying circuit 44. The comparator circuit 9, which can be formed as the known differential amplifier, produces output when the signal of the terminal 91 is larger than that of the terminal 92 and, therefore, $R_S \cdot |I| > |E|$. The output of the comparator circuit 9 is led to an AND circuit 10 together with the output of the OR circuit 7. Hence the AND circuit 10 produces output when both of the expressions (5) and (7) are satisfied. The output of the AND circuit 10, then, is given to an input terminal 110 of a pulse stretcher circuit 11 adapted to generate a consecutive signal from its output terminal 111 when supplied with an intermittent pulse signal at its input terminal 110.

Likewise, the output of the full-wave rectifying circuit 24 is led to an input terminal 291 of a comparator circuit 29 after having been amplified $L_S$ times by an amplifying circuit 28. To another input terminal 292 of the comparator circuit 29 is led the output of the full-wave rectifying circuit 44. The comparator circuit 29, which can be formed as the known differential amplifier, produces output when the signal of the terminal 291 is larger than that of the terminal 292 and, therefore, $L_S \cdot |dI/dt| > |E|$. The output of the comparator circuit 29 is led to an AND circuit 30 together with the output of the OR circuit 27. Hence the AND circuit 30 produces output when both of the expressions (4) and (6) are satisfied. The output of the AND circuit 30, then, is led to an input terminal 310 of a pulse stretcher circuit 31 which, like the pulse stretcher circuit 11, generates a consecutive signal from its output terminal 311 when supplied with an intermittent pulse signal at its input terminal 310 and which can be materialized in a circuit arrangement shown in FIG. 4 by way of example only.

Figure 4:
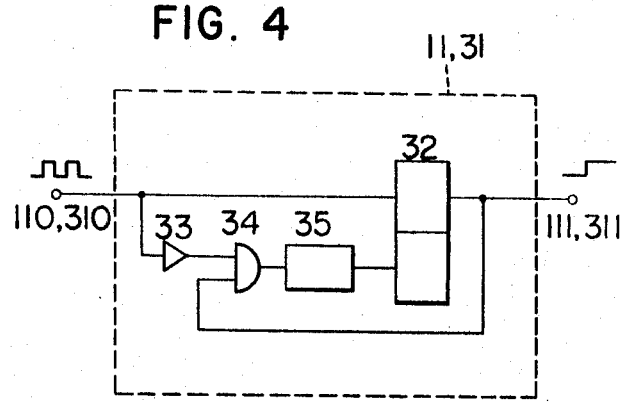
FIG. 4 is a connection diagram of a circuit portion for use in the circuit arrangement of FIG. 3.

In Fig. 4, the reference numeral 32 designates flip-flop circuit, becoming operative when supplied with a pulse signal to its input terminal 110 or 310 to generate a consecutive signal from its output terminal 111 or 311. The output of the flip-flop circuit 32 is led to an input terminal of an AND circuit 34, another input terminal of which is connected to the input terminal 110 or 310 via a NOT circuit 33. When the pulses at the input terminal 110 or 310 have extinguished following the operation of the flip-flop circuit 32, the AND circuit 34 produces output, setting a timer 35 which, when supplied with an input signal over a certain length of time, starts generating an output signal upon the lapse of that length of time, thus resetting the flip-flop circuit 32. Upon arrival of a second signal at the terminal 110 or 310 within the above length of time, one of the input signals to the AND circuit 34 is extinguished through the NOT circuit 33, so that the timer 35 is reset and thus no longer produces output. Hence the train of pulses fed to the input terminal 110 or 310 is converted into a consecutive signal.

Figure 5:
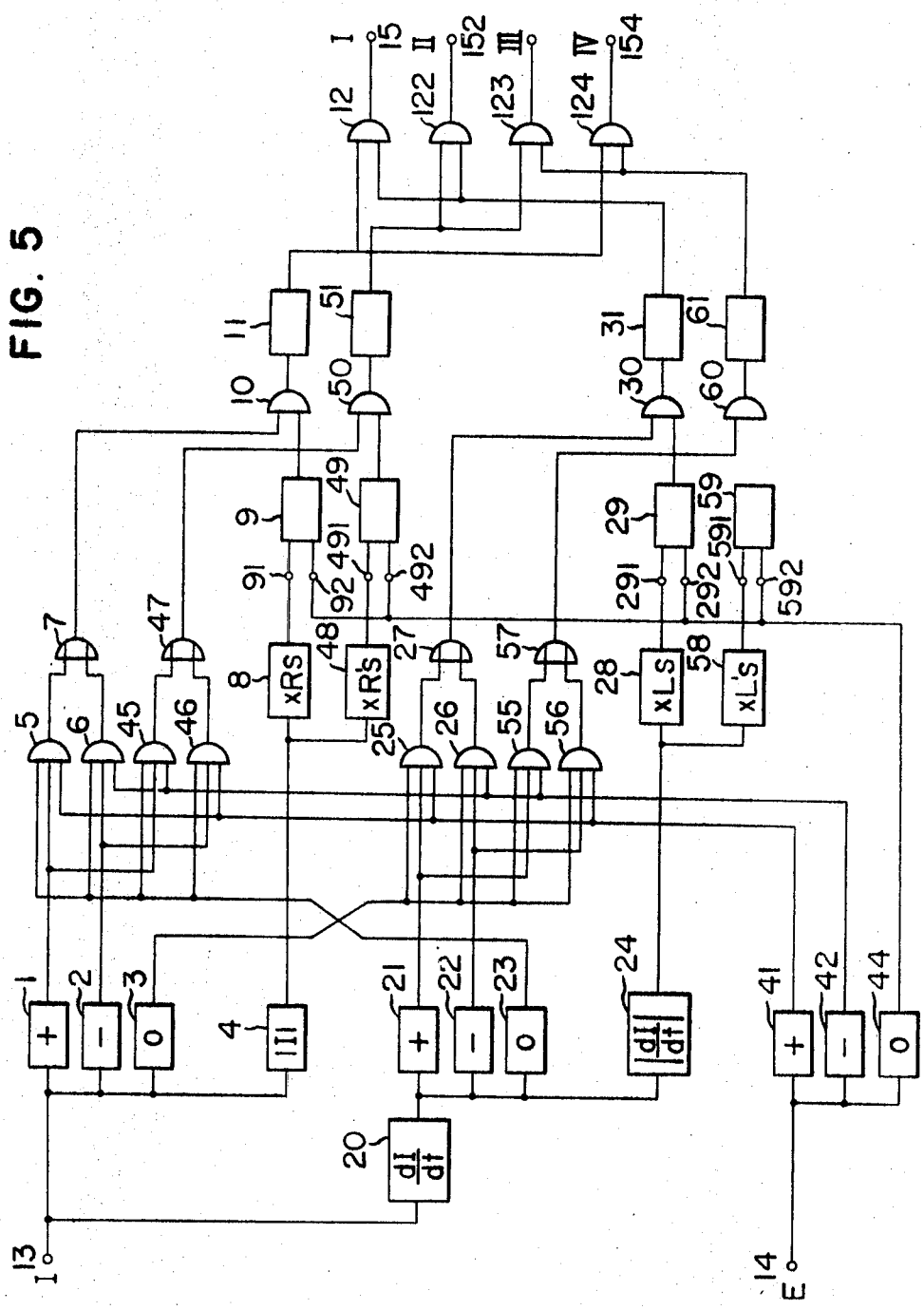
FIG. 5 is a connection diagram of a generalized version of the circuit arrangement of FIG. 3.

A more generalized version of the circuit arrangement of FIG. 3 is given in FIG. 5, with the use of like reference numerals to designate like component circuits in both of the drawings. To explain the functionings of the newly introduced components in the circuit arrangement of FIG. 5, an AND circuit 45 receives the outputs of circuits 1, 23 and 42 and produces output when $dI/dt=O$, $I>O$ and $E<O$. An AND circuit 46 receives the outputs of circuits 2, 33 and 41 and produces output when $dI/dt=O$, $I<O$ and $E>O$. An AND circuit 55 receives the outputs of circuits 3, 21 and 42 and produces output when $I=O$, $dI/dt>O$ and $E<O$. And an AND circuit 56 receives the outputs of circuits 3, 22 and 41 and produces output when $I=O$, $dI/dt<O$ and $E>0$.

The outputs of the AND circuits 45 and 46 are led to an OR circuit 47, so that this OR circuit 47 produces output if I and E are of different polarities when $dI/P'O$. And the outputs of the AND circuits 55 and 56 are led to an OR circuit 57, so that this OR circuit 57 produces output if $dI/dt$ and E are of different polarities when $I=O$. The output of a rectifying circuit 4, amplified $R'_s$ times by an amplifying circuit 48, is led to an input terminal 491 of a comparator circuit 49. To another input terminal 492 of the comparator circuit 49 is led the output of a rectifying circuit 44. The comparator circuit 49, which can be formed as the known differential amplifier, produces output when the signal of the terminal 491 is larger than that of the terminal 492 and, therefore, $R'_s|I|>|E|$. The output of the comparator circuit 49 is led to an AND circuit 50 together with the output of the OR circuit 47. Accordingly, the AND circuit 50 produces output if I and E are of different polarities and, at the same time, $|E/I|$ is smaller than $R'_s$ and when $dI/dt=O$. And the output of the AND circuit 50 is supplied to a pulse stretcher circuit 51 which is configured as the above circuit 11 and, therefore, as illustrated in FIG. 4.

In absolutely the same manner, a pulse stretcher circuit 61 generates an output signal if I and E are of different polarities and $$\left|E\middle/\frac{dI}{dt}\right|$$

is smaller than $L'_s$ when $I=O$, by the AND circuits 55 and 56, OR circuit 57, $L'_s$-time amplifying circuit 58, comparator circuit 59, which generates an output signal when the signal supplied to the input terminal 591 is larger than the supplied to its other input terminal 592, AND circuit 60 and pulse stretcher circuit 61.

Figure 7:
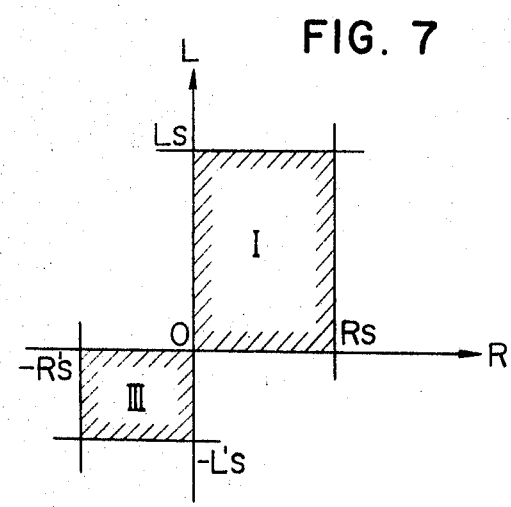
FIG. 7 diagrammatically show an example of the performance impedance characteristics of the current arrangement of FIG. 5.

The outputs of pulse stretcher circuits 11, 31, 51 and 61 are given to AND circuits 12, 122, 123 and 124 as follows: the outputs of the pulse stretcher circuits 11 and 31 to the AND circuit 12, the outputs of the pulse stretcher circuits 51 and 31 to the AND circuit 122, the outputs of the pulse stretcher circuits 51 and 61 to the AND circuit 123, and the outputs of the pulse stretcher circuits 11 and 61 to the AND circuit 124. Thus, at the output terminals 15, 152, 153 and 154 of the AND circuits 12, 122, 123 and 124, there appear the signals corresponding to the regions I, II, III and IV of FIG. 2b. It is accordingly possible to detect a fault caused somewhere behind the location of a relay by adequately setting $R'_s$ and $L'_s$. For instance, by leading the outputs of the output terminals 15 and 153 of FIG. 3 to an OR circuit (not shown), the output of this OR circuit is bound to show an impedance characteristic as illustrated in FIG. 7.

FIGS. 6a through 6d, illustrate the waveforms of the current I delayed from the voltage E by, respectively, 0—90 electrical degrees, 90—180 electrical degrees, 180—270 electrical degrees and 270—360 electrical degrees, together with the waveforms of the differential values $dI/dt$ of the respectively delayed currents. FIGS. 6e through 6h, inclusive, correspondingly show the vectors of the currents and voltages of FIGS. 6a through 6d.

Figure 6A:
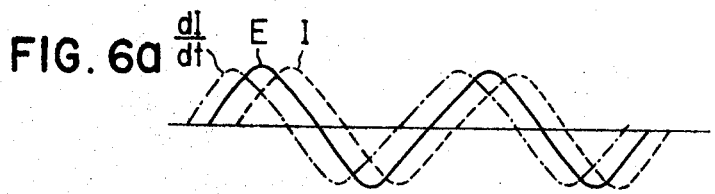
FIGS. 6a and 6h diagrammatically show waveforms and vectors relative to the voltage E, current I and its differential value $dI/dt$ of a power system, in order to explain the phase relations among them.
Figure 6B:
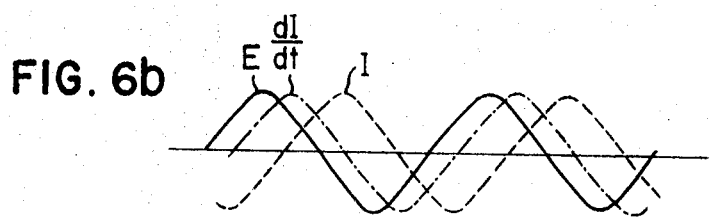
Figure 6C:
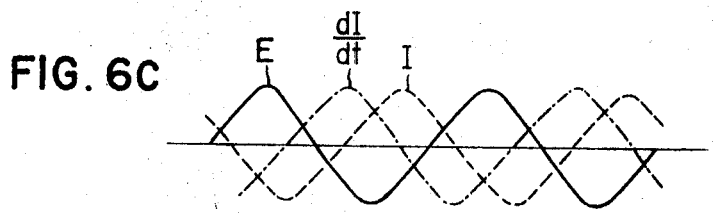
Figure 6D:
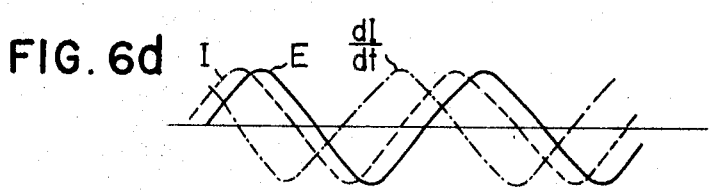
Figure 6E:
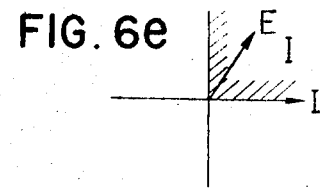
Figure 6F:
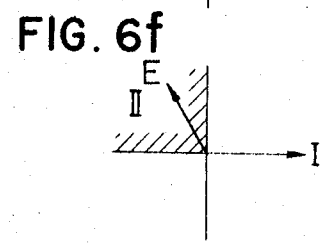
Figure 6G:
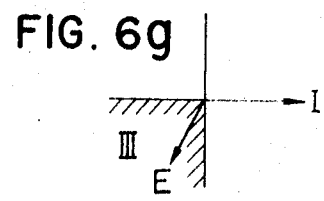
Figure 6H:
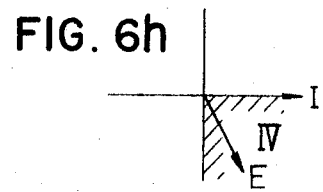

Suppose, for instance, the presence of a lagging fault current due to the presence of an internal fault, the phase relation between voltage and current in the instance is as illustrated in FIG. 6a, with the voltage E and the current I having the same polarity at both of the moments when $dI/dt=O$ and when $I=O$. Accordingly, if the impedance ($R+jwL$) to the location of the fault is less than the preset impedance ($R_s+jeL_s$), the terminal 15 of FIG. 5 produces output. When $R_s$ and $L_s$ are made infinitely great (i.e., when the amplification degree of the amplifiers 8 and 28 of FIG. 5 is made infinitely great), the output of the output terminal 15 will indicate only the direction of the fault location. The circuit arrangement of FIG. 5 will serve as directional relay if the OR circuits 7, 27, 47 and 57 are connected directly to the pulse stretcher circuits 11, 31, 51 and 61, without passing through the AND circuits 10, 30, 50 and 60.

Figure 8:
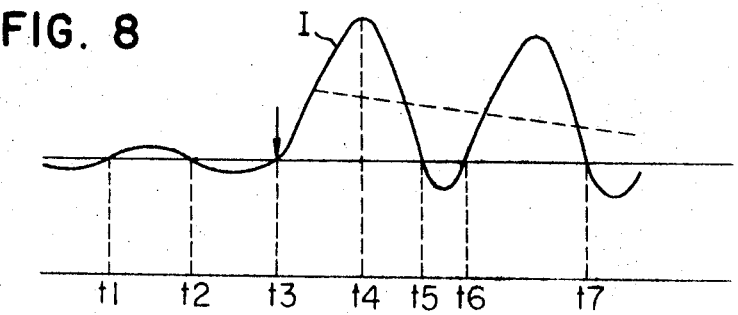
FIG. 8 diagrammatically shows the waveform of a current when a fault occurs at its zero point.
Figure 9:
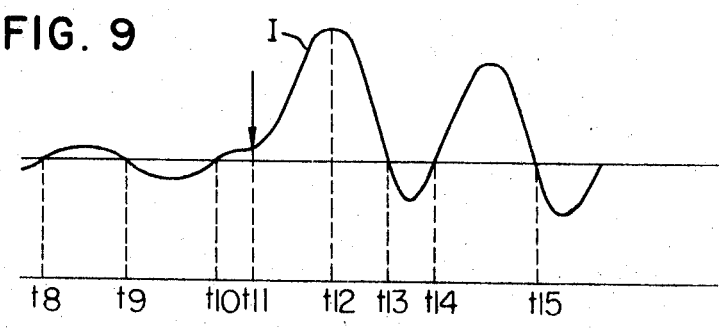
FIG. 9 diagrammatically shows the waveform of a current when a fault occurs at other than its zero point.

Now, let us consider the performance of the above circuit arrangement in actual use. The circuit arrangement of FIG. 3 or FIG. 5 is capable of instantaneous discrimination of the direction of the location of a fault, caused when the current I is at its zero point as in FIG. 8, during the first rise time of that current. In the same drawing the instants at which the current I passes its zero point are designated by $t1$, $t2$, $t3$, $t5$, $t6$ and $t7$. In the above case, then, a comparison $E/dI/dt$ at the instant $t3$ is made either in their quantities or polarities, so that final discrimination takes effect the the instant $t4$ when $dI/dt=O$. Consequently, the ensuing circuit breaking step may be completed by the instant $t5$ by means of a one-cycle breaker. In practice, however, a certain strength of a load current usually flows in precedence of the occurrence of a fault. Supposing now that a fault is caused at the instant 11, FIG. 9, the current I does not rise from or past its zero point, so that a fault-discriminating pulse is not generated at the moment of the fault occurrence but is delayed until the current I passes the instant $t13$ of its next cycle.

According to the present invention, therefore, this delay is obviated by making comparison between the polarities of E and $dI/dt$ not only when the current I passes its zero point but also st the moment when a trouble occurs, in view of the fact that the phase relation of the voltage and current of a power system at the moment of fault occurrence is determined almost solely by the inductance of its transmission lines.

Now, referring back to FIGS. 3 and 5, the circuit arrangement illustrated in either of the drawings may generate erroneous fault-discriminating pulses with respect to faults caused outside a line section under protection. This possibility with connection to the circuit arrangement of FIG. 3 will now be explained referring to FIGS. 10 and 11. Suppose that the normal load impedance is represented by a vector L on an impedance plane of FIG. 10. In case a fault occurs outside the line section under protection, with fault current flowing into the section, the impedance then will be represented by a vector $\dot F$ in FIG. 10. Let us reexamine this in terms of current. When a fault occurs at the instant $t0$ in the waveform of a current shown in $(I)$, FIG. 11, the AND circuit 10 of FIG. 3 generates a pulse at each zero point of the current I as in $(30)$, FIG. 11, before the occurrence of the fault, when the condition $$L_s \cdot \frac{dI}{dt} > E$$

while $I=O$ and the conditions $R_s$ $I<E$ while $dI/dt=O$ are satisfied. The pulse stretcher circuit 31, therefore, produces a sustained output as shown in $(31)$, FIG. 11. Nw, if a fault occurs at the instant $t0$ and at a distance (impedance) as shown by F in FIG. 10, the AND circuit 30 of FIG. 3 produces no output and, when the pulse stretcher circuit 31 is configured as in FIG. 4, the output of the pulse stretcher circuit 31 too becomes absent after the lapse of T second(s) from the moment when the last output pulse of the AND circuit 30 is generated. This length of time T corresponds to that set upon the timer 35 in the circuit arrangement of FIG. 4. On the other hand, with the conditions $R_S > |E/L|$ satisfied, the AND circuit 10 of FIG. 3 starts producing a pulse output, which is made consecutive by the pulse stretcher circuit 11 as shown in (10) and (11), FIG. 11, at the moment of the maximum or minimum value of the current $I$. Since the length of time T set upon the timer 35 cannot theoretically be shorter than half the normal cycle of the current, the output of the AND circuit 31 inevitably overlaps the output of the AND circuit 11. As a result, the AND circuit 15 of FIG. 3 produces output as shown in (15), FIG. 11, erroneously suggesting that the fault is caused within the line section under protection.

Figure 12:
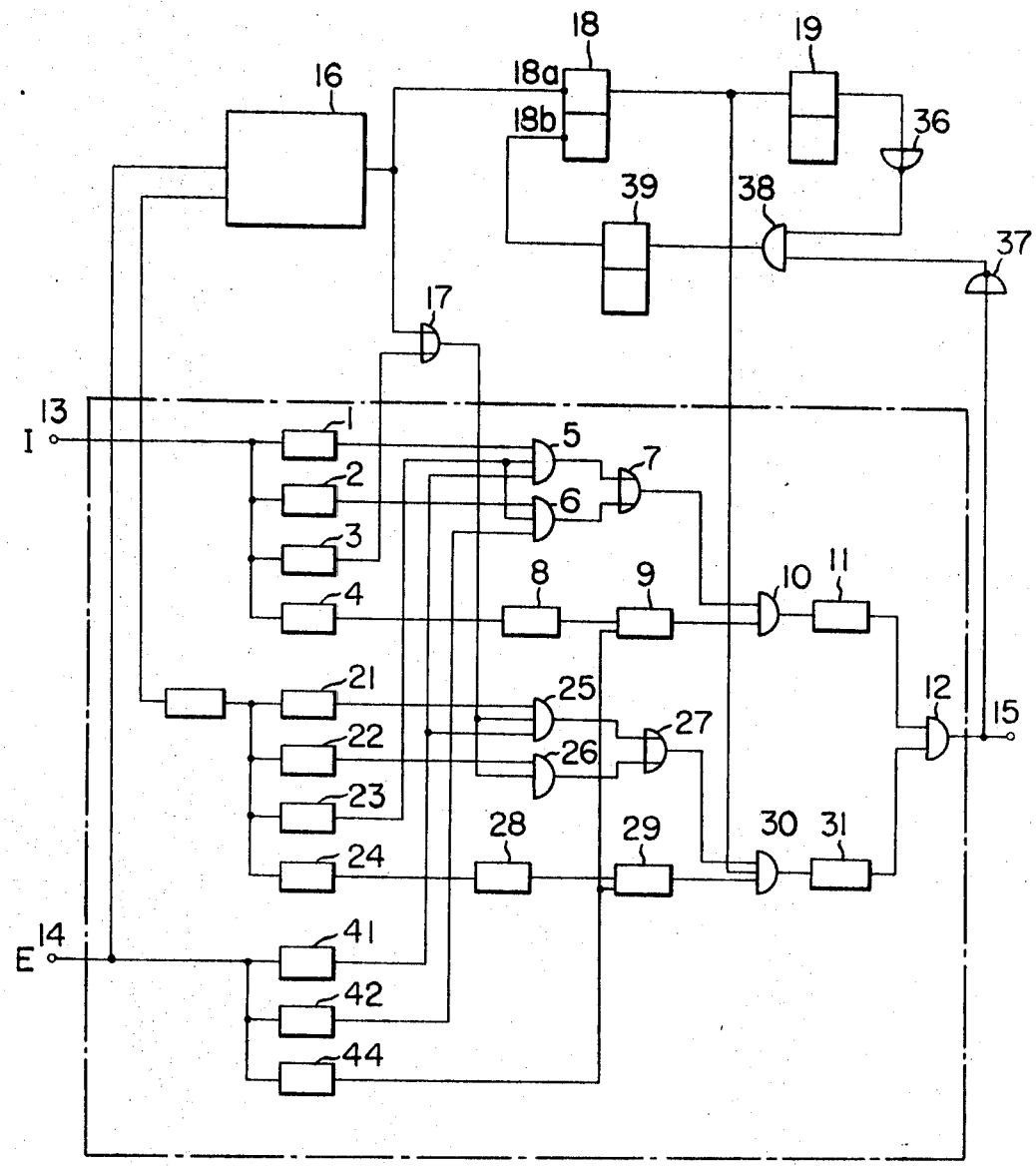
FIG. 12 is a block diagram of an improvement of the circuit arrangement of FIG. 3.

The present invention also provides means to eliminate there possible disadvantages of the circuit arrangements of FIGS. 3 and 5, as will be seen from FIG. 12 illustrating an improvement of the circuit arrangement of FIG. 3. That part of the circuit arrangement of FIG. 12 surrounded by the dots and dashes are identical with that shown in FIG. 3, except that signals are supplied to some gate circuits under different conditions. That is to say, AND circuits 25 and 26 are supplied with the output of a circuit 3, adapted for the zero-point detection of the current $I$, not directly but through on OR circuit 17; and AND circuit 30 is supplied not only with the outputs of an OR circuit 27 and a comparator circuit 29 but with the output of a flip-flop circuit 18 still to be described.

A newly introduced circuit 16 generates a pulse signal upon detection of an instant when a fault occurs, by the combined use of an overcurrent relay, undervoltage relay, current rate detector and the like. The output of the fault-detecting circuit, on one hand, is led to an input terminal of each of AND circuits 25 and 26 via the OR circuit 17, so that the AND circuits 25 and 26 give their output if the current $I$ passes its zero point or if a fault occurs when the differential value $dI/dt$ of the current and the voltage $E$ are of the same polarity. Thus, even where a fault current rises neither from nor past its zero point as in FIG. 9, discrimination is made upon the line inductance component between the instants $t11$ and $t12$, with a result that output is obtained at an output terminal 15 at the moment when the resistance component is discriminated at the instant $t2$.

The output of the fault-detecting circuit on the other hand is led to a set terminal 18a of the flip-flop circuit 18, where the occurrence of the fault is memorized. The output of the flip-flop circuit 18 is impressed both to an inductance-descriminating AND circuit 30 and to a monostable circuit 19. The output of the monostable circuit 19, after being reversed by a NOT circuit 36, is given to an AND circuit 38 together with the output signal of the output terminal 15 also reversed by the NOT circuit 36. The output of the AND circuit 38 is led to a second monostable circuit 39, while the output of this monostable circuit 39 is led to a reset terminal 18b of the flip-flop circuit 18. The monostable circuits 19 and 39 give output over a certain length of time when supplied with input. Suppose now that the fault-detecting circuit 16 detects a fault and generates its pulse signal, the flip-flop circuit 18 becomes operative to open the AND gate 30 thereby to actuate the monostable circuit 19. The monostable circuit 19 then generates a pulse signal with a duration of T19. Since this pulse signal is reversed by the NOT circuit 36, and AND circuit is kept closed for the T19 length of time, during which the fault is located. In case the location of the fault proves to be inside the line section under protection, the output terminal 15 produces output, which is reversed by the NOT circuit 37 so that the AND circuit 38 is deprived of one of its normal inputs. Accordingly, the monostable circuit 19 zeros its normal output after the lapse of the T19 length of time. Therefore, if the NOT circuit 36 generates its output signal, the AND circuit 38 produces no output, nor is the monostable circuit 39 actuated any longer, so that the flip-flop circuit 18 cannot possibly be reset then.

When the fault is eliminated succeedingly by a breaker and the like, with the resultant extinction of the output at the output terminal 15, the NOT circuit 37 resumes its output production. This output, together with the output of the NOT circuit 36, permits the AND circuit 38 to produce output to reset the flip-flop circuit 18 via the monostable circuit 39. As the monostable circuit 39 zeros its output upon the predetermined lapse of time, the inputs and outputs of these newly introduced circuits are restored to their original conditions.

If the fault is located outside the protected area, on the other hand, while the monostable circuit 19 is producing its output, no output is obtained at the output terminal 15. As a result, since the NOT circuit 37 maintains its output, the AND circuit 38 produces output at the instant when the monostable circuit 19 zeros its output upon the lapse of the T19 length of time, thereby resetting the flip-flop circuit 18 via the monostable circuit 39.

Figure 10:
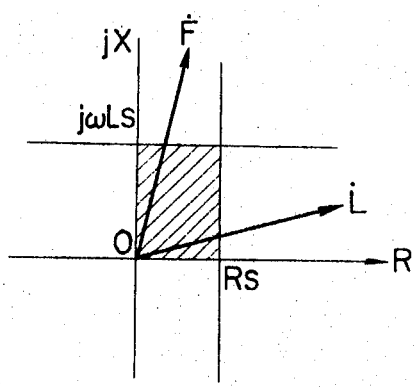
FIG. 10 is a vector diagram showing such a change in the vector of a normal load impedance that the circuit arrangement of FIG. 3 may function erroneously.
Figure 11:
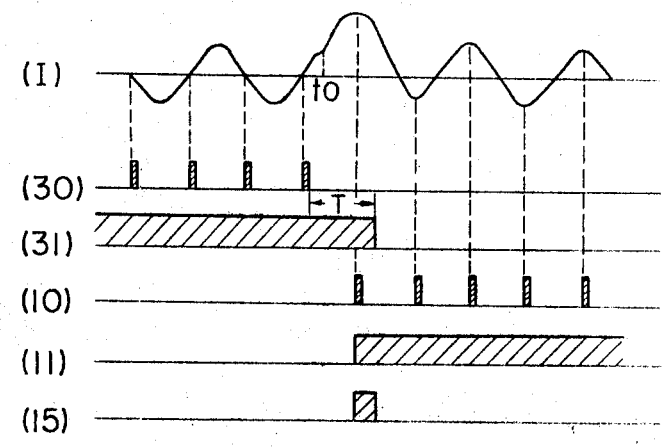
FIG. 11 diagrammatically show the output waveform of the circuit arrangement of FIG. 3 as well as the pulses generated by its component circuits in the above instance.

Hence the generation of erroneous pulses discussed with reference to FIG. 11 is avoidable by virtue of the circuits newly introduced in FIG. 12, whereby the discrimination as to inductance is effected only upon the occurrence of a fault. That is because, in case the impedance vector changes from $\dot{L}$ to $\dot{F}$ as shown in FIG. 10, the output of the flip-flop circuit 18 is extinguished before the occurrence of the fault, and that of the comparator circuit 29 thereafter, with a result that the AND circuit does not produce output in either case.

The circuits newly introduced in FIG. 12 to the circuit arrangement of FIG. 3 can of course be added to that of FIG. 5.

There are few possible problems that need consideration in the practical utilization of the circuit arrangement of FIG. 3, 5 or 12. One is that, once a pulse output is produced due to noise and the like, the pulse stretcher circuit may operate needlessly thereby to give false discrimination output. Such problems, however, can be overcome either by detecting the proper sequence of resistance discriminating pulses and inductance discriminating pulses or by detecting the consecutive generation of either one of the above two kinds of discriminating pulses within a predetermined length of time. These countermeasures, though they somewhat prolong the total elapsed time of fault discrimination, are nevertheless desirable in view of the resultantly obtained accuracy in discrimination.

Figure 13:
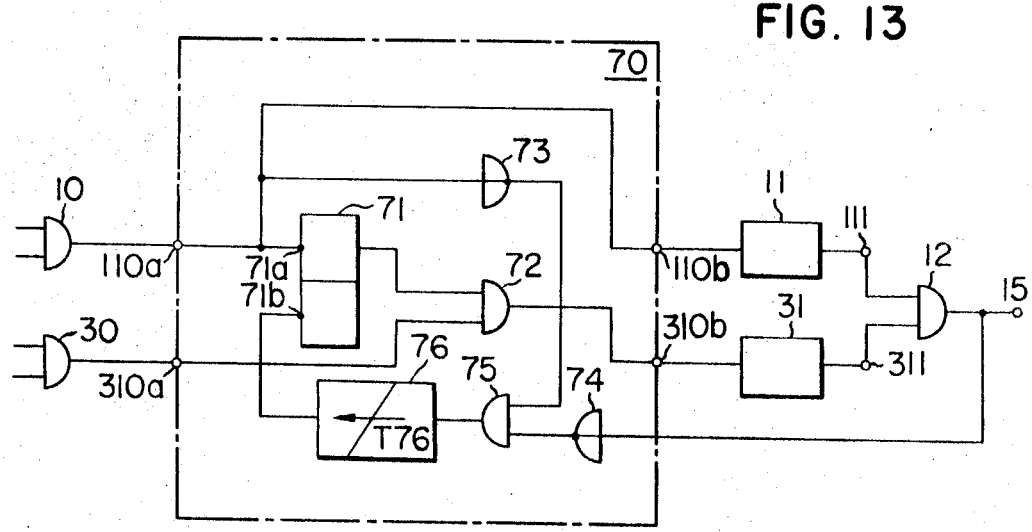
FIG. 13 is a block diagram of another improvement of the circuit arrangement of FIG. 3.

FIG. 13 illustrates still another embodiment of the invention, i.e., a circuit arrangement, which produces output only when fault discriminating pulses have appeared in a predetermined sequence, with the introduction of a circuit portion surrounded by dots and dashes and marked 70 between the AND circuits 10 and 30 and the pulse stretcher circuits 11 and 31 in the circuit arrangement of FIG. 3. FIG. 13 thus represents only the output side following the AND circuits 10 and 30 of FIG. 3, while most of the circuit arrangement thereof is omitted. The terminals 110 and 310 of FIG. 3 are split into 110a and 110b, and 310a and 310b, respectively, with the interposition of a circuit portion 70 therebetween. The circuit portion 70 incorporates a flip-flop circuit 71, AND circuits 72 and 75, NOT circuits 73 and 74, and timer 76. The output of the AND circuit 10, which generates a pulse signal if the absolute value of the quotient of voltage and current ($|E/I|$) is smaller than the preset value $R_S$ and the voltage and current have the same polarity when the differential value of the current is zero, is led to a set terminal 71a of the flip-flop circuit 71. The output of this flip-flop circuit 71 is led to one of the input terminals of the AND circuit 72, to the other of which is led the output of the AND circuit 30.

As is mentioned already, the AND circuit 30 produces a pulse signal if the absolute value of the quotient of the voltage and the differential value of the current ($|E/(dI/dt)|$) is smaller than the preset value $L_S$ and the voltage and the differential value of the current have the same polarity when the instantaneous value of the current is zero. The output of the AND circuit 10 is also led to the NOT circuit 73 as well as to the pulse stretcher circuit 11. The output of the AND circuit 72 is led to the pulse stretcher circuit 31, and the outputs of the two pulse stretcher circuits 11 and 31, are led to the AND circuit 12. The output of this AND circuit 12 is utilized as fault-discriminating output at the output terminal 15 and also is reversed to one of the input terminals of the AND circuit 75 via the NOT circuit 74. To the other input terminal of the AND circuit 75 is led the output of the NOT circuit 73. The output of the AND circuit 75 is led to the timer 76 which, when supplied with an input signal for T76 length of time or more, starts producing output that is extinguished together with the extinction of the input signal. The output of this timer 76 is led to the reset terminal 71b of the flip-flop circuit 71.

Figure 14A:
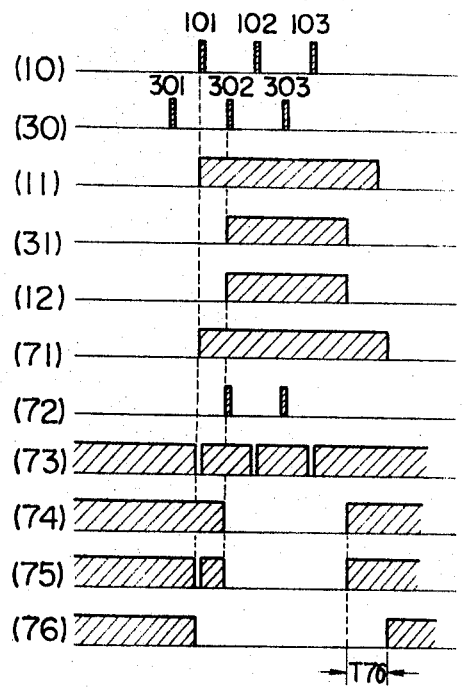
FIGS. 14a and 14b are time charts showing the output waveforms of the component circuits of the improved circuit arrangement of FIG. 13.
Figure 14B:
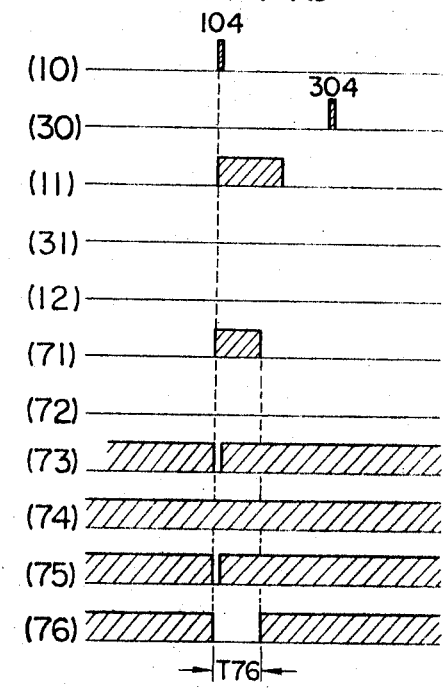

FIGS. 14a and 14b are time charts showing the output waveforms of the component circuits of FIG. 13, the output waveform of the AND circuit 10 in (10), the output waveform of the AND circuit 30 in (30) and so on with corresponding reference numerals. Since ordinarily the outputs of the AND circuits 10 and 30 and therefore of the AND circuit 12 are absent, the NOT circuits 73 and 74 are therefore the AND circuit 75 and the timer 76 too produce their outputs. If the AND circuit 30 circuit 30 produces a fault-discriminating pulse 301 in that state, the AND circuit 72 does not operate since the flip-flop circuit 71 is left reset, so that the overall condition of the above circuit arrangement is not altered. On the other hand, if the AND circuit 10 produces a fault-discriminating pulse 101, the pulse 101 is first stretched by the pulse stretcher circuit 11 and then is led to one of the input terminals of the AND circuit 12. And since the pulse 101 is reversed by the NOT circuit 73, the AND circuit 75 is interrupted its output production, with a result that the timer 76 is reset. Simultaneously, the flip-flop circuit 71 is set and starts producing output. Upon extinction of the pulse 101, the NOT circuit resumes the production of its output which, together with the output of the NOT circuit 74, satisfies the input conditions of the AND circuit 75, while this AND circuit then energizes the timer 76 with its resumed output production. If the period of time T76 set upon the timer 76 is made longer than the normal spacing between the pulse 101 and pulse 102, no output is yet produced from the timer 76 when the succeeding pulse 302 arrives from the AND circuit 30. Therefore, the flip-flop is kept set at that time, so that the AND circuit 72 becomes operative to feed its pulse output to the pulse stretcher circuit 31, while this pulse stretcher circuit 31 feed the stretched pulse output to one of the input terminals of the AND circuit 12. Since the other input terminal of the AND circuit 12 is already impressed with the output of the pulse stretcher circuit 11, this AND circuit 12 produces its output at the output terminal 15. By this output is the output of the NOT circuit zeroed, as is the output of the AND circuit 75, so that the timer 76 is again reset.

Supposing the successive arrival of the pulses 102, 303 and 103 the pulse stretcher circuit 11 directly makes consecutive the output pulses of the AND circuit 10 while the pulse stretcher circuit 31 makes consecutive the output pulses of the AND circuit 30 indirectly (on condition that the output of the flip-flop circuit 71 is being produced); hence the AND circuit 12 keeps on producing output. As the outputs of the AND circuits 10 and 30 are extinguished by the cutting off of the faulty section of the power system, the AND circuit 75 resumes output production at the instant when either of the pulse stretcher circuits 11 and 31 stops output production. Upon the lapse of the T76 length of time from that instant, the timer 76 becomes operative, resetting the flip-flop circuit 71 and restoring all the inputs and outputs of the circuit arrangement to their original states.

On the other hand, if, as shown in FIG. 14b, a fault-discriminating output pulse 104 of the AND circuit 10 and a fault-discriminating output pulse 304 of the AND circuit 30 arrive independently or spaced apart more than the predetermined length of time, the AND circuit 12 produces no output. That is because the input conditions of the AND circuits 72 are not satisfied either when either one of the output pulses of the AND circuits 10 and 30 arrive independently or when, as shown in FIG. 14b, the both pulses 104 and 304 arrive spaced apart more than the T76 length of time, in which latter case the timer 76 becomes operative to reset the flip-flop circuit 71. It will therefore be apparent that the T76 length of time set upon the timer 76 has to be longer than the time interval between the output pulses of the AND circuits 10 and 30 in case the DC component is superposed upon fault current to the maximum possible degree.

Thus does the circuit arrangement of FIG. 13 prevent itself from erroneous operation due to noise and other extraneous causes, for it produces final fault-discriminating output only upon detection of the output pulse of the AND circuit 30 following the output pulse of the AND circuit 10 within the predetermined period of time. It is of course possible to rearrange the circuit configuration of FIG. 13 in such a manner that it produces the final fault-discrimination output upon detection of the output pulse of the AND circuit 10 following the output pulse of the AND circuit 30 within the predetermined period of time.

Figure 15:
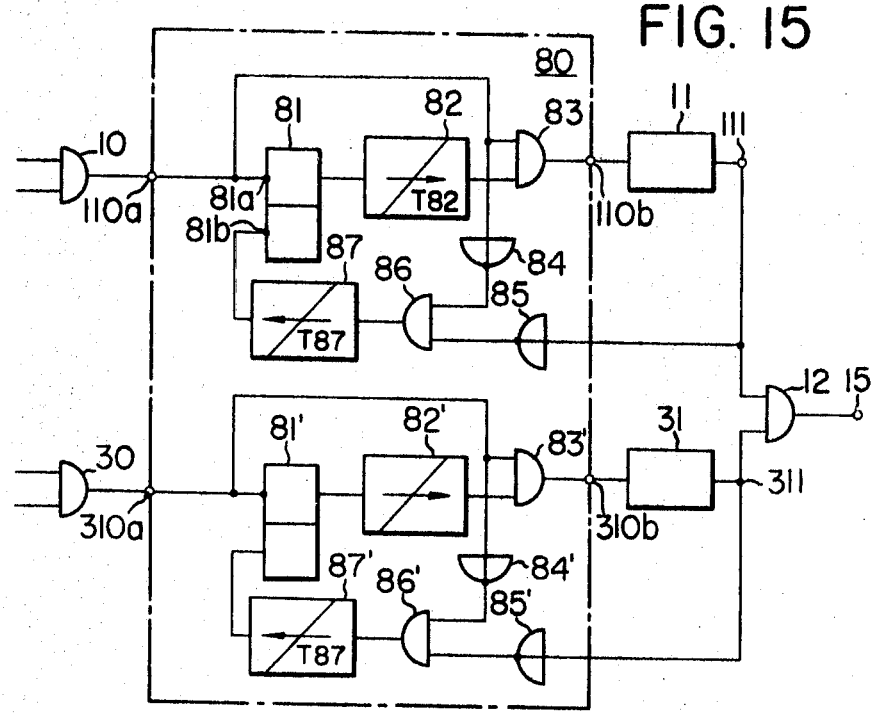
FIG. 15 is a block diagram of still another improvement of the circuit arrangement of FIG. 3.

Illustrated in FIG. 15 is still another embodiment of the invention, wherein output is obtained at an AND circuit 12 only when two fault-discriminating output pulses are generated from each of AND circuits 10 and 30 within a predetermined period of time. The circuit arrangement of FIG. 15 corresponds to that of FIG. 3, only with the interposition of a circuit portion 80 between the AND circuits 10 and 30 and the pulse stretcher circuits 11 and 31 of FIG. 3. Arrangement relative to the circuit portion 80 is as follows:

The output terminal of the AND circuit 10 is connected to a set terminal 81a of a flip-flop circuit 81, one of the input terminals of an AND circuit 83, and the input terminal of a NOT circuit 84. The output of the flip-flop circuit 81 is directed to a timer 82, set to operate upon the lapse of a T82 length of time, while the output of this timer 82 is directed to the remaining input terminal of the AND circuit 83. The output of the AND circuit 83 is led to the pulse stretcher circuit 11, while the output of this pulse stretcher circuit 11 is led to one of the input terminals of an AND circuit 12 and to a NOT circuit 85. The outputs of both the NOT circuits 84 and 85 are led to an AND circuit 86 whose output is then led to a timer 87 that is set to operate upon the lapse of a T87 length of time. The output of the timer 87 is led to a reset terminal 81b of the flip-flop circuit 81. The timers 82 and 87 generate their output signals when applied with their respective input signals in a sustained manner for T82 and T87 lengths of time or more, respectively.

The component circuits interposed between the AND circuit 30 and pulse stretcher circuit 31 function the same way as the foregoing circuits 81 through 87, so that they are made to carry the corresponding reference numerals, only with a mark '.

Figure 16A:
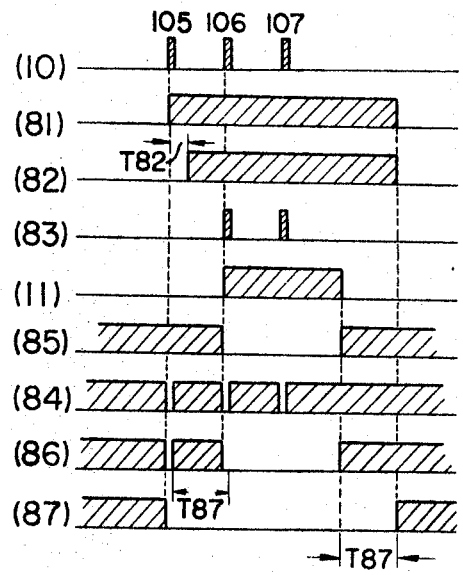
FIGS. 16a and 16b are time charts showing the output waveforms of the component circuits of the improved circuit arrangement of FIG. 15.

The functions and operations of these component circuits will now be described with reference to FIGS. 16a and 16b, the former drawing being a time chart showing the output waveforms of the component circuits in case the AND circuit 10 has produced fault-discriminating output pulses in a normal state at the time of the occurrence of a fault, and the latter drawing being a time chart correspondingly showing the output waveforms of the component circuits in case the AND circuit 10 has abnormally produced output pulses due to noise and the like.

As a fault-discriminating output pulse 105 is produced by the AND circuit 10, the outputs of the NOT circuit 84 and therefore the AND circuit 86 become zero, so that the timer 87 is reset. The flip-flop circuit 81, thus set, gives its output to the timer 82, while this timer 82 after a short T82 length of time gives its output to the AND circuit 83, thereby opening the circuit. Therefore, the succeeding pulse 106 is generated by the AND circuit 10, and the pulse 106 is led via the AND circuit 83 to the pulse stretcher circuit 11 thus causing it to produce output at its output terminal 111. The output of the pulse stretcher circuit 11, reversed by the NOT circuit 85, zeros the output of the AND circuit 86, so that the timer 87 is reset and, therefore, the flip-flop circuit 81 is kept set. A fault-discriminating output pulse 107, is produced succeedingly by the AND circuit 10, is led via the AND circuit 83 and the pulse stretcher circuit 11 and arrives at the terminal 111 as a consecutive output signal. Since, on the other hand, the fault-discriminating output pulses of the AND circuit 30 are processed in absolutely the same way, it follows that the AND circuit 12 produces output when two output pulses are generated by each of the AND circuits 10 and 30 within the T87 length of time.

If the AND circuit 10 fails to produce an output pulse following the pulse 107, the NOT circuit 85 produces output at the instant when the output of the pulse stretcher circuit 11 becomes zero. Since the NOT circuit has then been producing output, the AND circuit 86 starts energizing the timer 87 with its resumed output production. The timer 87 resets the flip-flop circuit 81 upon the lapse of the T87 length of time and thus zeros its output and, therefore, the output of the timer 82. Hence all the component circuits are restored to their original states.

Figure 16B:
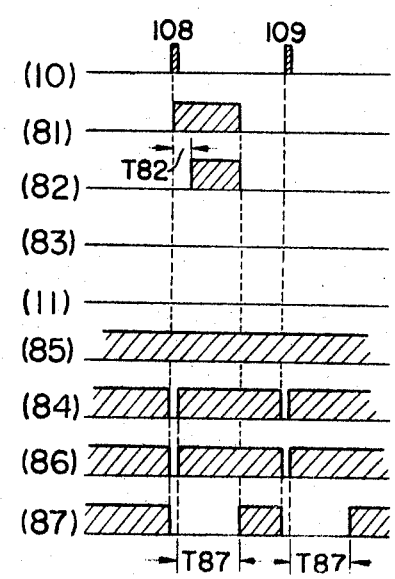

In case, as shown in (10), FIG. 16b, the fault-discriminating pulses 108 and 109 are produced from the AND circuit 10 spaced apart more than the T87 length of time, the flip-flop circuit 81, once set, is reset by the timer 87 during the time interval between the pulses 108 and 109. When the pulse 109 is produced, therefore, there is no output from the timer 82 which constitutes the other input condition of the AND circuit 83, so that the AND circuit 83 as well as the pulse stretcher circuit 11 produces no output.

Description was made hereinbefore on the configurations and performances of the fundamental circuit arrangement of FIG. 3, its generalized version of FIG. 5 and improved versions of FIGS. 12, 13 and 15. For the practical utilization of there circuit arrangements, however, there remain a couple of problems that need consideration. One is the use of the differentiating circuit in the fundamental circuit arrangement of FIG. 3. Though indispensable to obtain a distance to the location of a fault, the differentiating circuit tends to cause errors in fault discrimination when the discrimination is concerned only with the determination of the direction of the fault location. This is because various surge voltages are present in power transmission systems in general. Having such high-rising speeds, these surge voltages are apt to be detected by the differentiating circuit magnified to inordinate degrees.

The present invention, then, has it also as an object to provide a directional relaying apparatus which does not need a differentiating circuit. The inventive directional relaying apparatus is based upon the fact that the expression:

$$L\frac{dI}{dt} \doteq E$$

is established for the most part at the instant of fault occurrence, and that the polarity of current at the instant when the absolute value of the instantaneous value of the current exceeds a specific value is in coincidence with the polarity of the differential value of that current.

Suppose that a current of a positive polarity flows in the line. The polarity of the differential value of the current is positive between 0 and 90 electrical degrees of the current and is negative between 90 and 180 electrical degrees. Now, the instant when the absolute value of the instantaneous value of the current exceeds a predetermined value is present in the 0°—90° range, not in the 90°—180° range. Accordingly, whether a fault is internal or external to the protected area can be detected if it is known whether, at the instant when the instantaneous value of the current exceeds the predetermined value, with the current having a known polarity, the polarity of voltage is in coincidence with the polarity of the current.

Figure 17:
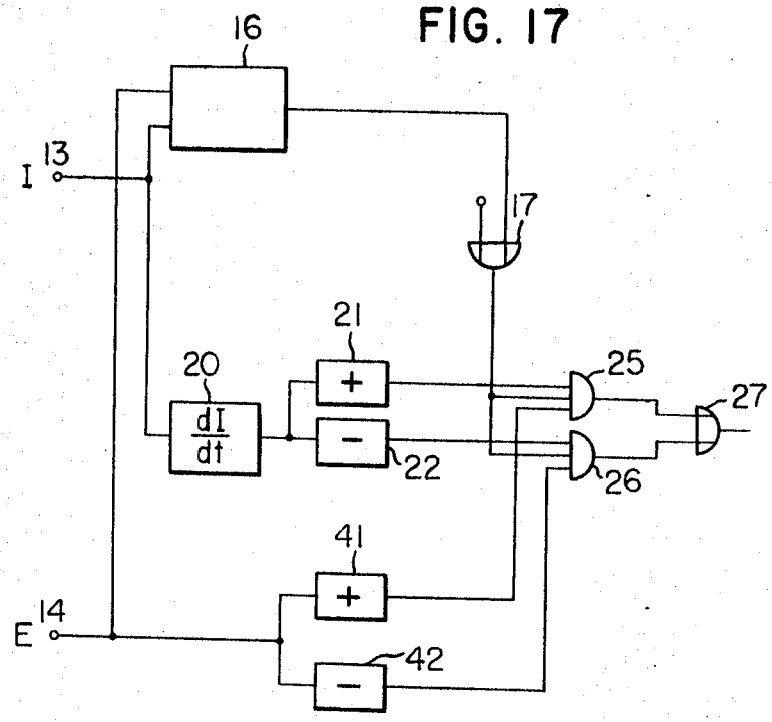
FIG. 17 diagrammatically shows part of the circuit arrangement of FIG. 3.
Figure 18:
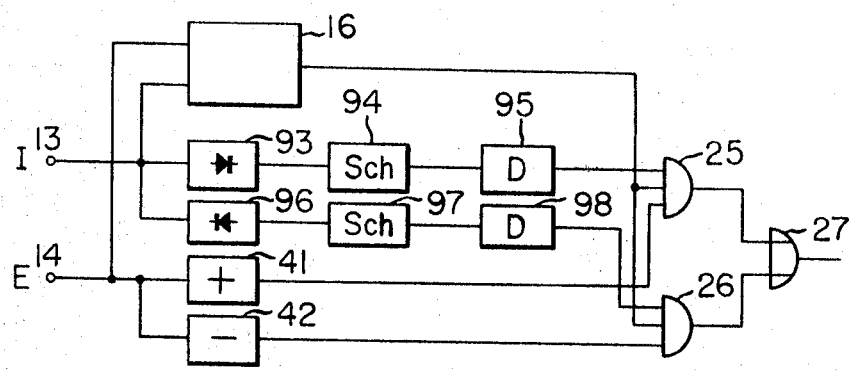
FIG. 18 is a connection diagram of an improved, but substantially equivalent, version of the circuit arrangement of FIG. 17.

This idea is embodied in the circuit arrangement of FIG. 18, which functions almost equivalently to that of FIG. 17 showing part of the circuit arrangement of FIG. 3. In the drawing, the reference numerals 93 and 96 designate circuits permitting the passage of only the positive and negative half waves, respectively, of current; 94 and 97 Schmidt circuits and the like which produce outputs when the outputs of the circuits 93 and 96 reach a predetermined value; and 95 and 98 differentiating circuits adapted to detect the rise time of the output pulses of the Schmidt circuits 94 and 97. As a fault-detecting circuit 16 detects a fault, it sends a consecutive output to AND circuits 25 and 26. Then, half a cycle or so later, the differentiating circuit 95 or 98 produces output and then, in case the fault is found internal, the AND circuit 25 or 26 operates depending on which of a circuit 41 (adapted to detect the positive polarity of voltage E) and circuit 42 (to detect the negative polarity of the voltage E) is producing output. In the circuit arrangement of FIG. 17, the OR circuit 27 produces output simultaneously with the start of the operation of the fault-detecting circuit 16 due to the presence of the differentiating circuit 20. The circuit arrangement of FIG. 18, on the other hand, has a delay in fault discrimination which corresponds to the time interval between the operation of the fault-detecting circuit 16 and the output production of the differentiating circuit 95 or 98. Yet the latter has a higher degree of exactitude of operation in that it is insensitive to surge currents.

In order to further improve the performance of the circuit arrangement of FIG. 18, a phase-shift circuit to compensate for the resistance component R of the system may be inserted into the current I detecting circuit in such a manner as to establish the expression $$L\frac{dI}{dt} \doteq E,$$

and also an adequate monostable circuit may be provided instead of the differentiating circuits 95 and 98 so that fault discrimination is made at the instant when the outputs of the Schmidt circuits have been produced for a predetermined length of time.

Although certain specific embodiments of the invention have been shown and described, it will be obvious that a great many modifications, substitutions and changes thereof are possible. The invention, therefore, is not intended to be restricted to the exact showing of the drawings and description thereof, but is considered to include reasonable and obvious equivalents.

What we claim is:

1. A superhigh-speed protective relaying system which comprises comparing between the instantaneous value of the voltage and the differential value of the current of a power system as to their polarities and quantities at the instant when the instantaneous value of the current is zero, comparing between the instantaneous value of the voltage and the instantaneous value of the current of the power system as to their polarities and quantities at the instant when the differential value of the current is zero, and discriminating whether the location of a fault is inside or outside the protected area of the power system on the basis of the above comparisons.

2. A superhigh-speed protective relaying system as claimed in claim 1, wherein said comparison between the instantaneous value of the voltage and the differential value of the current of a power system as to their polarities and quantities is executed at the instant when a fault occurs in the power system and when the instantaneous value of the current is zero.

3. A superhigh-speed protective relaying system as claimed in claim 1, which comprises a step of comparing between the voltage and current of a power system as to their polarities at the instant when increase in the absolute value of the instantaneous value of the current is detected following the occurrence of a fault in the power system, whereby the direction of the location of the fault is discriminated from the result of the comparison.

4. A superhigh-speed protective relaying apparatus comprising first means for comparing between the instantaneous value of the voltage and the differential value of the current of a power system as to their polarities and quantities at the instant when a fault occurs in the power system and when the instantaneous value of the current is zero, second means for comparing between the instantaneous value of the voltage and the instantaneous value of the current of the power system as to their polarities and quantities at the instant when the differential value of the current is zero, and means which produce output when the outputs of both of said first means and said second means are produced succeedingly within a predetermined length of time.